ps://United States Patent Office 2,772,920
Patented Dec. 4, 1956

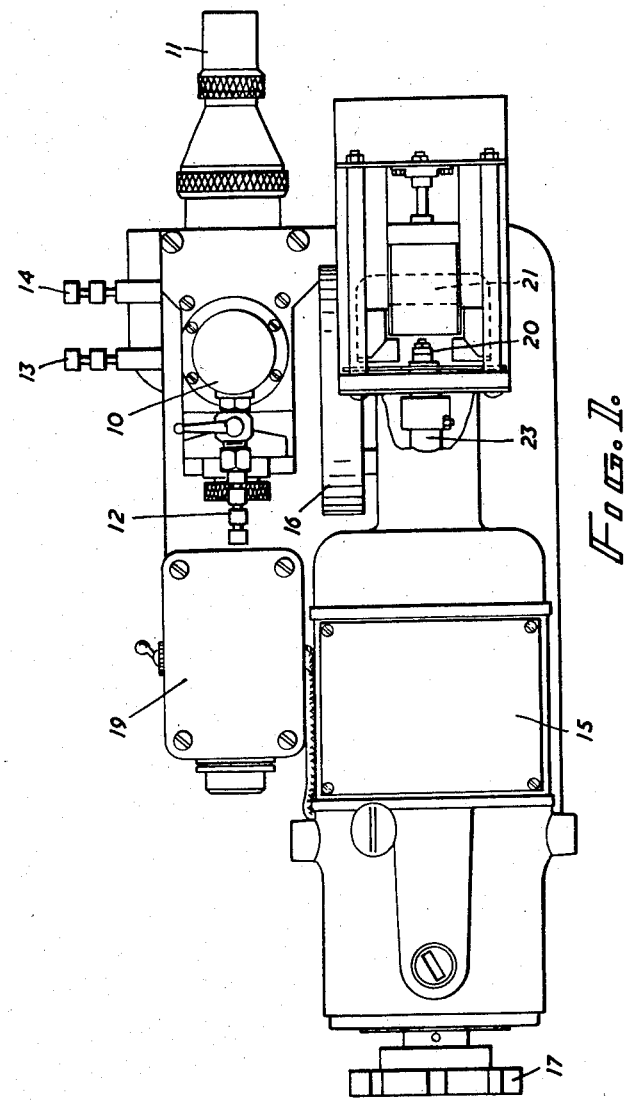

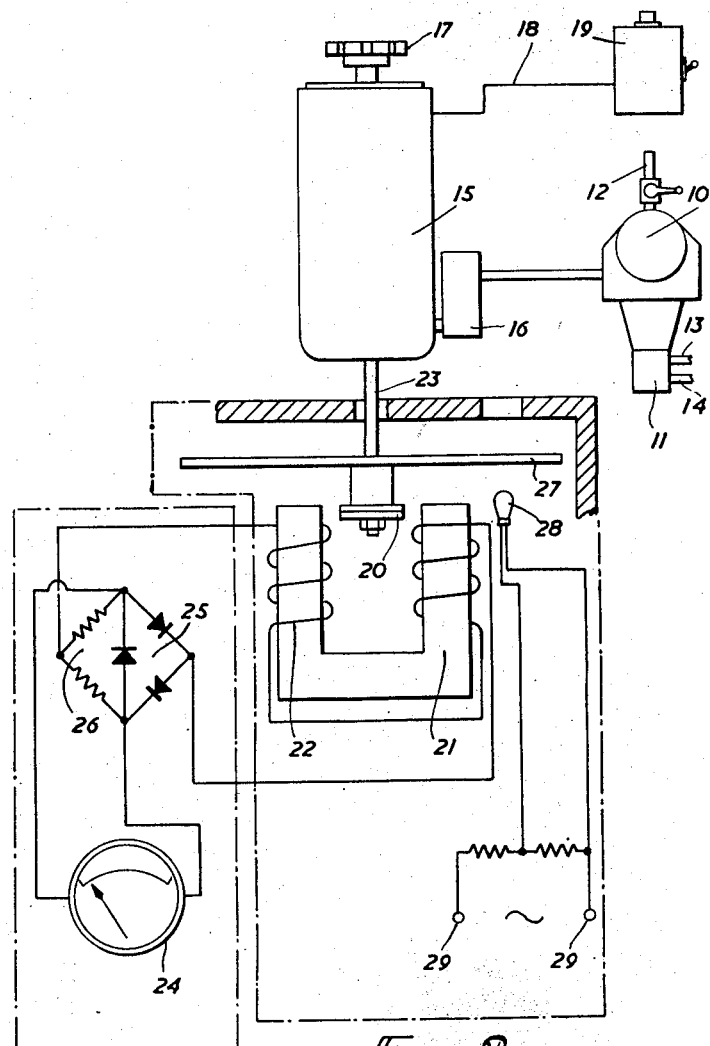

2,772,920

HOT METAL SPRAY GUNS

William O. Lee, Stopsley, and Cledwyn Williams, Oakley, England, assignors to D. Napier & Son Limited, London, England, a British company Application July 29, 1955, Serial No. 525,303

Claims priority, application Great Britain August 5, 1954

1 Claim. (Cl. 299—28.8)

This invention relates to hot metal spray guns of the kind in which a rod or wire of metal is automatically fed from a feed unit by means of a small driving motor and a reduction gear into an arc or flame where the metal is melted and delivered through a nozzle in the form of a spray by means of a jet of compressed air or other gas. In such motors control of the density of the metal spray is effected by varying the feed rate of the wire into the gun, by varying the speed of the driving motor.

Hot metal spray guns of this kind may be used to coat surfaces with thin layers of metal, and particularly in cases where the thin metal layer is to be used as an electrical surface heating element, for example as described in British Patent No. 703,374, it is desirable to be able to control accurately the density of the metal spray delivered by the gun in order to be able to control the density, thickness, and electrical resistance characteristics of the metal layer applied to the surface.

It is an object of the invention to provide means for controlling or indicating the rate of feed of the metal wire into the gun, since it is this feed rate which largely determines the density of the metal spray. The rate of feed is however relatively low and this creates difficulties in providing an accurate indication of the feed rate without complex and expensive apparatus.

According to the present invention apparatus for indicating the rate of feed of wire to a hot metal spray gun of the kind referred to comprises a dynamo-electric generator arranged to be driven by the feed motor for the wire, and an electrical indicator device to which the output from the generator is led and which thus provides an indication of the rate of feed of wire.

It has been found that instead of using a frequency measuring instrument a simple current or voltage responsive device may be used as the indicator device with satisfactory results.

In any case the dynamo-electric generator is preferably driven directly by the motor, and thus at a relatively high speed in relation to the driving members of the wire feed unit.

Preferably the dynamo-electric generator comprises a permanent magnet mounted for rotation between two or more pole pieces, the pole pieces being provided with a coil which is connected to the indicator device.

According to a preferred feature of the invention the apparatus includes a stroboscopic calibrating or checking device, comprising a stroboscope disc connected for rotation with the motor, and means for illuminating at least part of the disc under intermittent light, the frequency of the intermission being controlled from a known standard frequency such as mains frequency.

In this case the apparatus will preferably include means for adjusting the setting of the indicator device to calibrate the indicator reading to the known rate of feed of the wire as determined from the known standard frequency.

For convenience the stroboscope disc and the rotor of the generator will preferably be mounted on the motor shaft itself.

The invention may be performed in various different ways but one specific embodiment will now be described by way of example, with reference to the accompanying drawings, in which:

Figure 1 is a plan view (partly broken away) of a hot metal spray gun incorporating a feed measuring device according to the invention, and Figure 2 is a diagrammatic representation of the electrical circuits included therein.

The hot spray gun to be described is particularly suitable for applying a thin aluminium layer to be used as an electrical heating element on external aircraft surfaces, for example as described and claimed in British Patent No. 703,374. Hot metal spray guns of this general type are well known and in the present case the gun includes a mechanical feed unit 10 including feed rollers (not shown) which are arranged to feed a 1.5 mm. wire of substantially pure aluminium through a propane/oxygen flame, the molten metal being blown in the form of a spray through a nozzle 11 by compressed air admitted through a pipe 12. The propane and oxygen are supplied through conduits 13, 14. The density of the spray is controlled by regulating the speed of a motor 15 driving the feed unit 10 for the wire through a reduction gear 16, and to control the amount of metal deposited on the surface an accurate indication of the rate of feed of the wire into the gun is needed.

The motor 15 comprises a variable speed 1/16 H. P. single phase electric motor linked to the feed wheels of the unit 10 by the 150 to 1 reduction gear 16. The speed of the motor is controlled in known manner by a manual control knob 17, while the current supply circuit 18 includes a master switch 19. The wire is fed to the propane/oxygen flame at the rate of 4.187 inches per turn of the feed wheels, and the speed of the wheels is variable from 3.5 to 16.5 R. P. M. The corresponding range of motor speeds is approximately 540 to 3580 R. P. M.

The apparatus for measuring the feed rate of the wire comprises in general an alternating current electric generator connected to the feed motor of the gun and associated with an electrical indicator device. The generator comprises a rotor consisting of a small bar-type compass magnet 20 and a stator in the form of a U-shaped laminated core 21 carrying a winding 22. The rotor 20 is mounted directly on the driving shaft 23 of the feed motor 15 and is arranged between the tips of the limbs of the stator core 21.

This generator has the desirable feature of imposing negligible torque load upon the wire feed motor 15, which is thus practically independent of the rate indicating system and unaffected by even a breakdown of same, yet gives an output substantially linear with speed over the normal operating range and sufficiently great to drive a suitably calibrated electrical indicating meter 24 (not shown in Figure 1 since it has been removed to show the generator). Due to the high output of the generator, and the substantially linear relationship between the speed of the rotor 20 and the mean current or voltage output of the stator windings 22, contrary to the usual practice of feeding a pulsating generator output into a type of frequency meter, in the present example the output of the generator is fed to a suitably calibrated volt meter or ammeter 24 through a full wave instrument rectifier 25 and a series resistance circuit 26, with an additional rectifier connected in shunt with the indicating meter in order to improve the lineality of indication. In the present example the indicator device 24 is a moving coil microammeter of 200 μa. full scale deflection.

The indicator device thus constitutes a feed rate indicating device and may be calibrated by timing the feed period of measured lengths of wire. To this end the apparatus also includes a stroboscopic checking device comprising a perforated strobe disc 27 attached to the main motor spindle 23 and a neon lamp 28 connected to mains A. C. supply 29 and specially adapted to glow only on the peaks of the supply voltage. The number of perforations in the strobe disc 27 may be calculated from the formula:

$$n = 2f \cdot 60/N$$

where $n$ is the number of perforations in the disc 27.
$f$ is the mains supply frequency (c./s.) 29.
$N$ is the speed of the driving motor 15 in R. P. M.

Even though the mains frequency may fall as much as 2% below the standard frequency, the inaccuracy in the actual wire feed rate at a motor speed of approximately 1,000 R. P. M. amounts to no more than 0.2 inch per minute.

The apparatus provides a simple and accurate determination of the rate of feed of the wire and enables the density of the metal spray and hence the character of the applied coating to be controlled within fine limits. Moreover the apparatus is extremely light and compact, and is mounted complete as one unit with the spray gun itself.

What we claim as our invention and desire to secure by Letters Patent is:

A hot metal spray gun comprising means for heating one end of a metal rod to a substantially molten state, means for supplying a blast of gas adjacent said end of the metal rod to project the molten metal in the form of spray, and means for feeding the metal rod progressively towards the heating means including a motor, at least one feed wheel bearing on the rod, and a reduction gear interposed between the motor and the wheel, and means for indicating the rate of feed of the metal rod comprising a dynamo-electric generator driven directly by the feed motor at the same speed and an electrical indicator device comprising an electric motor selected from the class including voltmeters and ammeters to which the output from the generator is led.

References Cited in the file of this patent

FOREIGN PATENTS 430,147    Great Britain _____ June 13, 1935